United States Patent [19]
Hsu

[11] Patent Number: 5,602,525
[45] Date of Patent: Feb. 11, 1997

[54] SIGNAL LAMP ASSEMBLY FOR USE WITH THE GEAR LEVER

[76] Inventor: Chin-Yung Hsu, 4F, No. 7, Lane 10, Sec. 3, Hsin Sheng S. Rd., Taipei, Taiwan

[21] Appl. No.: 381,732

[22] Filed: Feb. 1, 1995

[30] Foreign Application Priority Data

Dec. 29, 1994 [CN] China ................................. 94248612.9

[51] Int. Cl.$^6$ ........................................... B60Q 1/00
[52] U.S. Cl. ..................... 340/456; 362/61; 200/61.88; 74/473 R
[58] Field of Search .................... 340/456; 362/61; 200/61.85, 61.88; 74/475, 473 R

[56] References Cited

U.S. PATENT DOCUMENTS 1,705,069  3/1929  Saurman ................................. 340/456
3,524,979  8/1970  Cohen ..................................... 340/456
3,749,473  7/1973  Stewart ................................... 362/62
4,199,747  4/1980  Miller et al. ............................ 340/456

Primary Examiner—Jeffery Hofsass
Assistant Examiner—Edward Lefkowitz
Attorney, Agent, or Firm—Merchant, Gould, Smith, Edell, Welter & Schmidt, P.A.

[57] ABSTRACT

A signal lamp assembly including a transparent shell, an electric box mounted inside the shell to hold an electric box, a neon tube mounted within the shell outside the electric box and electrically connected to the circuit board inside the electric box, and a mount for mounting the shell on the top end of the gear lever of a car by a socket, wherein the electric box has a control panel disposed outside the shell, and a 3-step switch mounted on the control panel and controlled to turn on/off the neon tube or to drive the neon tube to flash. The signal lamp assembly can be detached from the gear lever and attached with an elongated battery box to form a hand-held signal lamp.

7 Claims, 5 Drawing Sheets

SIGNAL LAMP ASSEMBLY FOR USE WITH THE GEAR LEVER

BACKGROUND OF THE INVENTION

The present invention relates to signal lamps, and relates more particularly to a neon tube type signal lamp assembly for use with the gear lever of a motor vehicle.

FIG. 1 shows a neon lamp device installed in the gear lever of a motor vehicle. This structure of neon lamp device has an ON/OFF switch mounted on the outside of the transparent shell thereof and controlled to turn on/off the neon tube inside. The internal electric circuit of the neon lamp device is extended out a hole on the transparent shell and inserted through a hole on the bottom covering of the gear lever and then connected to the electric circuit of the motor vehicle. Therefore, the neon lamp device cannot be detached from the gear lever for a separate use when installed.

SUMMARY OF THE INVENTION

It is one object of the present invention to provide a neon tube type signal lamp assembly which can be detachably installed in the gear lever of a motor vehicle and controlled to give a visual signal. It is another object of the present invention to provide a neon tube type signal lamp assembly which can be attached with an elongated battery box to use as a hand-held signal lamp. It is still another object of the present invention to provide a neon tube type signal lamp assembly which can be controlled to give light as well as to flash. It is still another object of the present invention to provide a neon tube type signal lamp assembly which has an electric socket for connection to the battery power supply or socket for cigarette lighter of a motor vehicle or any external battery power supply. It is still another object of the present invention to provide a neon tube type signal lamp assembly which is simple in structure and inexpensive to manufacture.

According to one aspect of the present invention, the signal lamp assembly comprises transparent transparent shell, an electric box mounted inside the shell to hold an electric box, a neon tube mounted within the shell outside the electric box and electrically connected to the circuit board inside the electric box, and a mount for mounting the shell on the top end of the gear lever of a car by a socket, wherein the electric box has a control panel disposed outside the shell, and a 3-step switch mounted on the control panel and controlled to turn on/off the neon tube or to drive the neon tube to flash. According to another aspect of the present invention, the control panel of the electric box has an electric socket electrically connected to the circuit board for connection to the battery power supply or socket for cigarette lighter of the motor vehicle, or an external battery power supply. According to still another aspect of the present invention, the mount has an annular chamber and a plurality of longitudinal grooves spaced around the annular chamber for mounting the transparent shell; the transparent shell has a bottom coupling neck fitted into the annular chamber of the mount, and a plurality of longitudinal ribs raised from the bottom coupling neck and engaged with the longitudinal grooves of the mount respectively to ensure a stable connection between the transparent shell and the mount. According to still another aspect of the present invention, the signal lamp assembly can be detached from the gear lever and attached with an elongated battery box to form a hand-held signal lamp.

DETAILED DESCRIPTION OF THE PREFERRED EMBODIMENT

Figure 1:
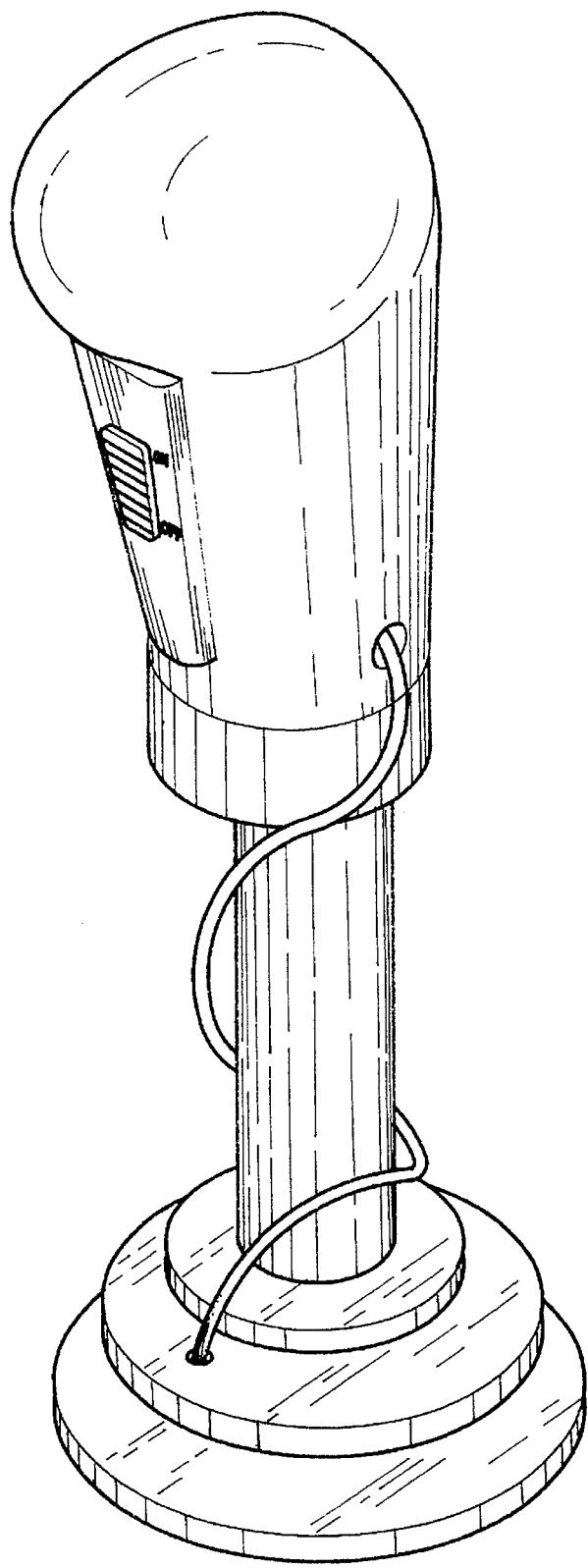
FIG. 1 shows a neon lamp device installed in a motor vehicle's gear lever according to the present invention.
Figure 2:
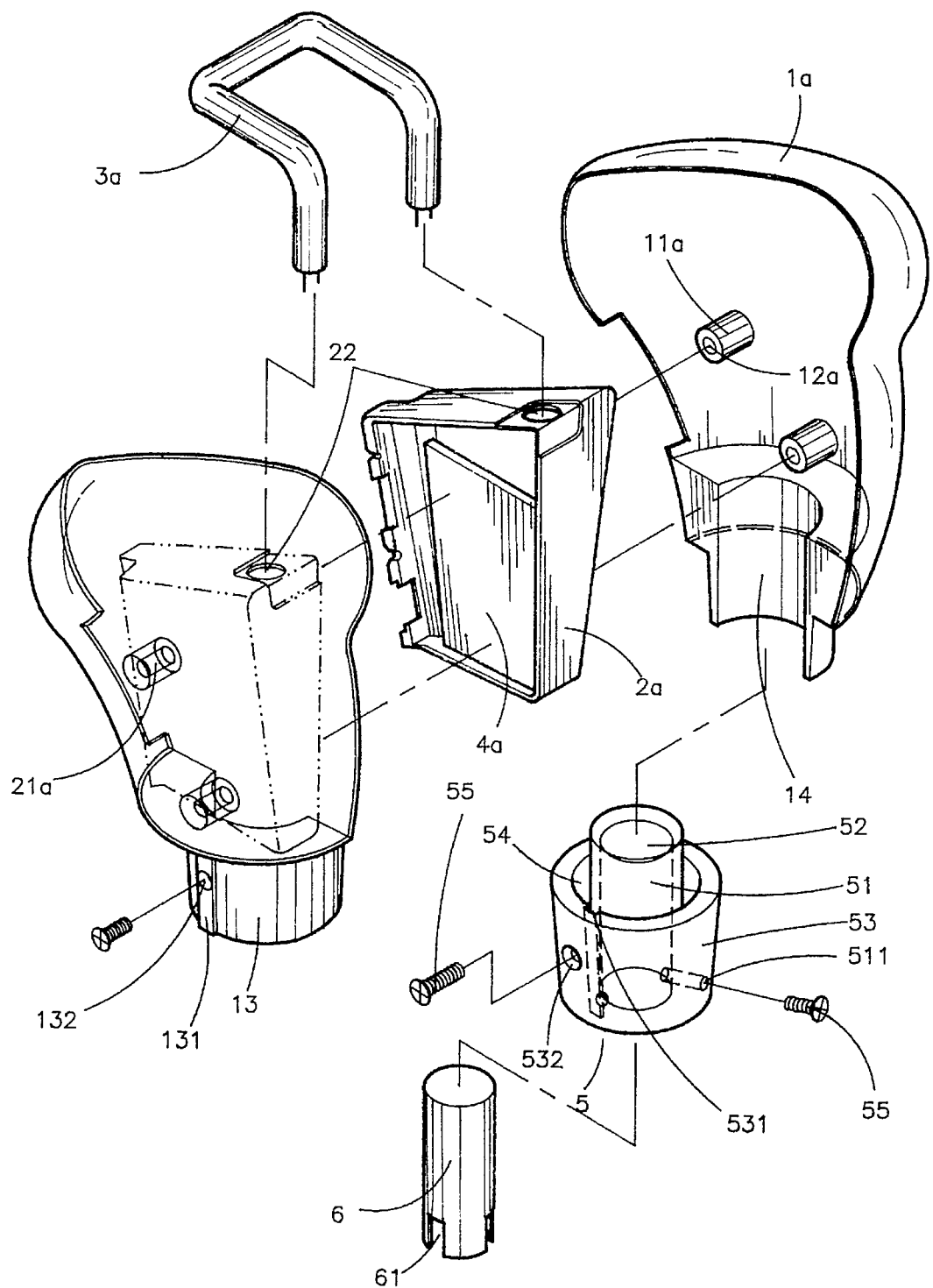
FIG. 2 is an exploded view of a signal lamp assembly according to the present invention.
Figure 3:
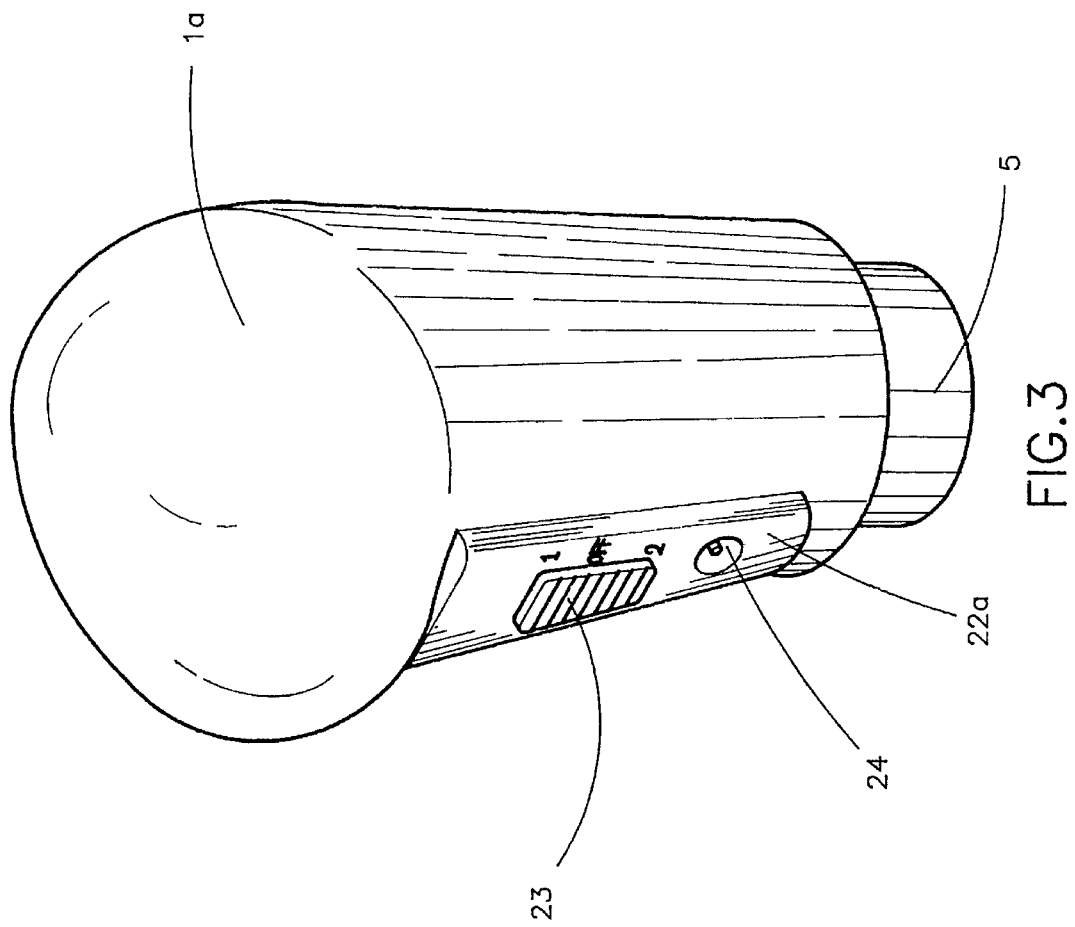
FIG. 3 is an elevational view of the signal lamp assembly shown in FIG. 2.

Referring to FIGS. 2 and 3, a neon lamp assembly is designed for use with the gear lever of a motor vehicle, comprised of a transparent shell 1a, an electric box 2a, a neon tube 3a, a circuit board 4a, a mount 5, and a socket 6.

The electric box 2a is mounted inside the transparent shell 1a, having two insertion holes 22 at the top, through which the two opposite ends of the neon tube 3a are inserted and electrically connected to the circuit board 4a, which is mounted inside the electric box 2a, and a control panel 22a extended out of the transparent shell 1a. The control panel 22a of the electric box 2a comprises an ON/OFF/FlASH three-step switch 23, and an electric socket 24 disposed at an elevation below the switch 23. The electric socket 24 is connected to the circuit board 4a in the electric box 2a by an electric wire (not shown). The circuit board 4a is controlled by the switch 23 to turn on/off the neon tube 3a or to cause the neon tube 3a to flash. Power supply for the electric socket 24 can be obtained from the car battery power supply, the socket for cigarette lighter of the car, or the battery power supply of an emergency lamp. Different electric adapters shall be used for connecting the electric socket 24 to different power supply outlets. The transparent shell 1a comprises a bottom coupling neck 13, a longitudinal bottom hole 14 through the bottom coupling neck 13, a plurality of longitudinal ribs 131 raised from the outside wall of the bottom coupling neck 13, and a plurality of locating holes 132 through each longitudinal rib 131. The transparent shell 1a further comprises a plurality of locating posts 11a raised from the inside wall thereof, each locating post 11a defining a respective pin hole 12a. The electric box 2a further comprises a plurality of locating pins 21a raised from the outside wall thereof and respectively fitted into the pin holes 12a on the locating posts 11a. The mount 5 comprises an upright center post 51 defining a longitudinal bottom hole 52, which receives the socket 6, an annular outer wall 53 defining an annular chamber 54 around the upright center post 51, which annular chamber 54 receives the coupling neck 13 of the transparent shell 1a, a plurality of longitudinal grooves 531 on the inner side of the annular outer wall 53, which receive the longitudinal ribs 131 of the coupling neck 13 of the transparent shell 1a, a plurality of locating holes 532 radially made through the annular outer wall 53 and the longitudinal grooves 531 and respectively connected to the locating holes 132 on the longitudinal ribs 131 of the coupling neck 13 of the transparent shell 1a by screws 55, and a screw hole 511 made through the annular outer wall 53 at an elevation below the locating holes 132. The socket 6 has a plurality of bottom notches 61 around the bottom end.

Figure 4:
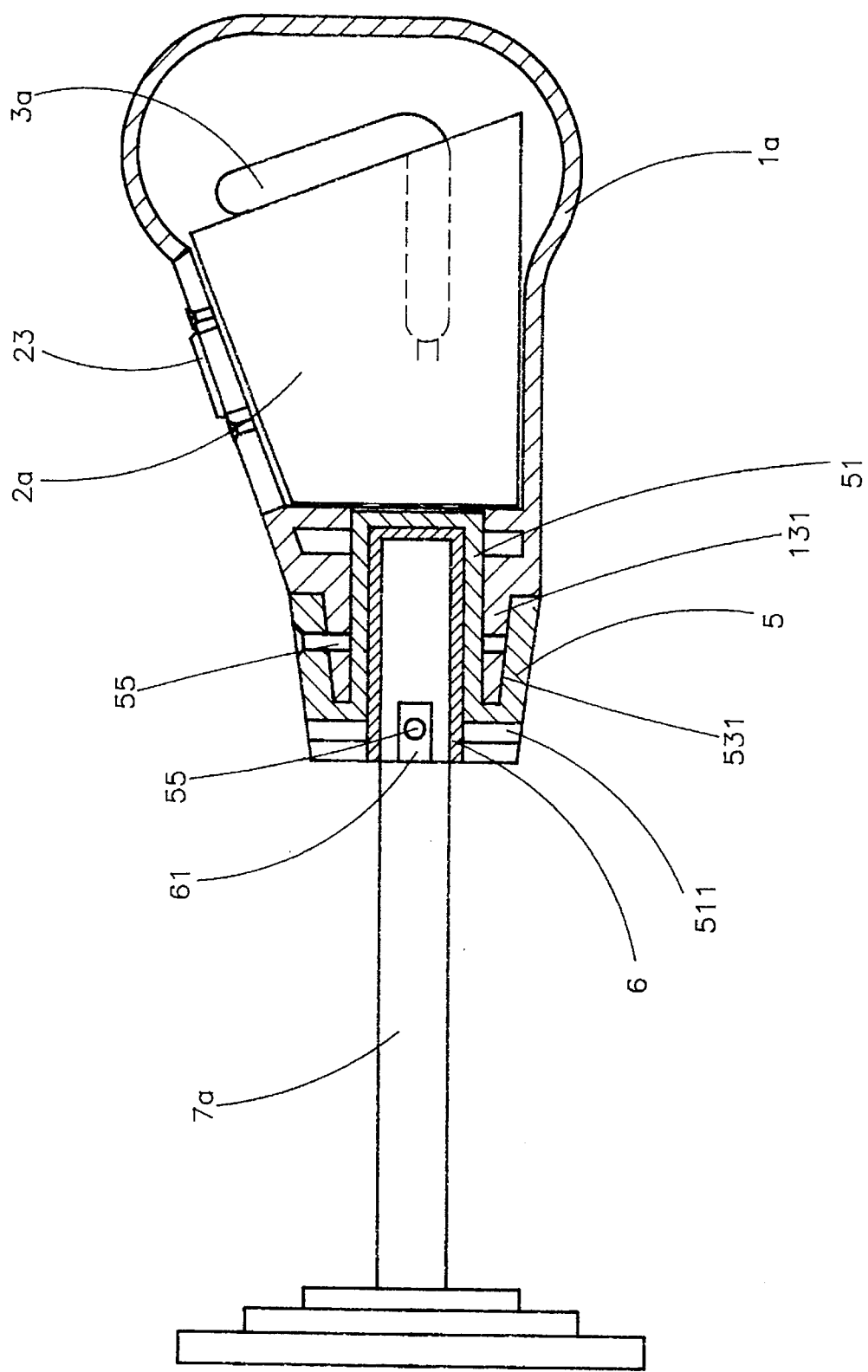
FIG. 4 shows the signal lamp assembly of the present invention installed in a motor vehicle's gear lever.

Referring to FIG. 4, the transparent shell 1a and the mount 5 are connected together by inserting coupling neck 13 of the transparent shell 1a into the annular chamber 54 of the mount 5 and the upright center post 51 of the mount 5 into the longitudinal bottom hole 14 on the coupling neck 13 of the transparent shell 1a, permitting the longitudinal ribs 131 to be respectively forced into the longitudinal grooves 531, and then threading respective screws 55 into the locating holes 532 on the annular outer wall 53 of the mount 5 and the locating holes 132 on the longitudinal ribs 131 of the coupling neck 13 of the transparent shell 1a. When the transparent shell 1a and the mount 5 are fastened together, the socket 6 is inserted into the longitudinal bottom hole 52 on the mount 5 and then mounted on the top end of the gear lever 7a, then a screw 55 is threaded into the screw hole 511 on the annular outer wall 53 of the mount 5 and one bottom notch 61 on the socket 6 and stopped against the gear lever 7a. Therefore, the mount 5 is secured to the gear lever 7a.

Figure 5:
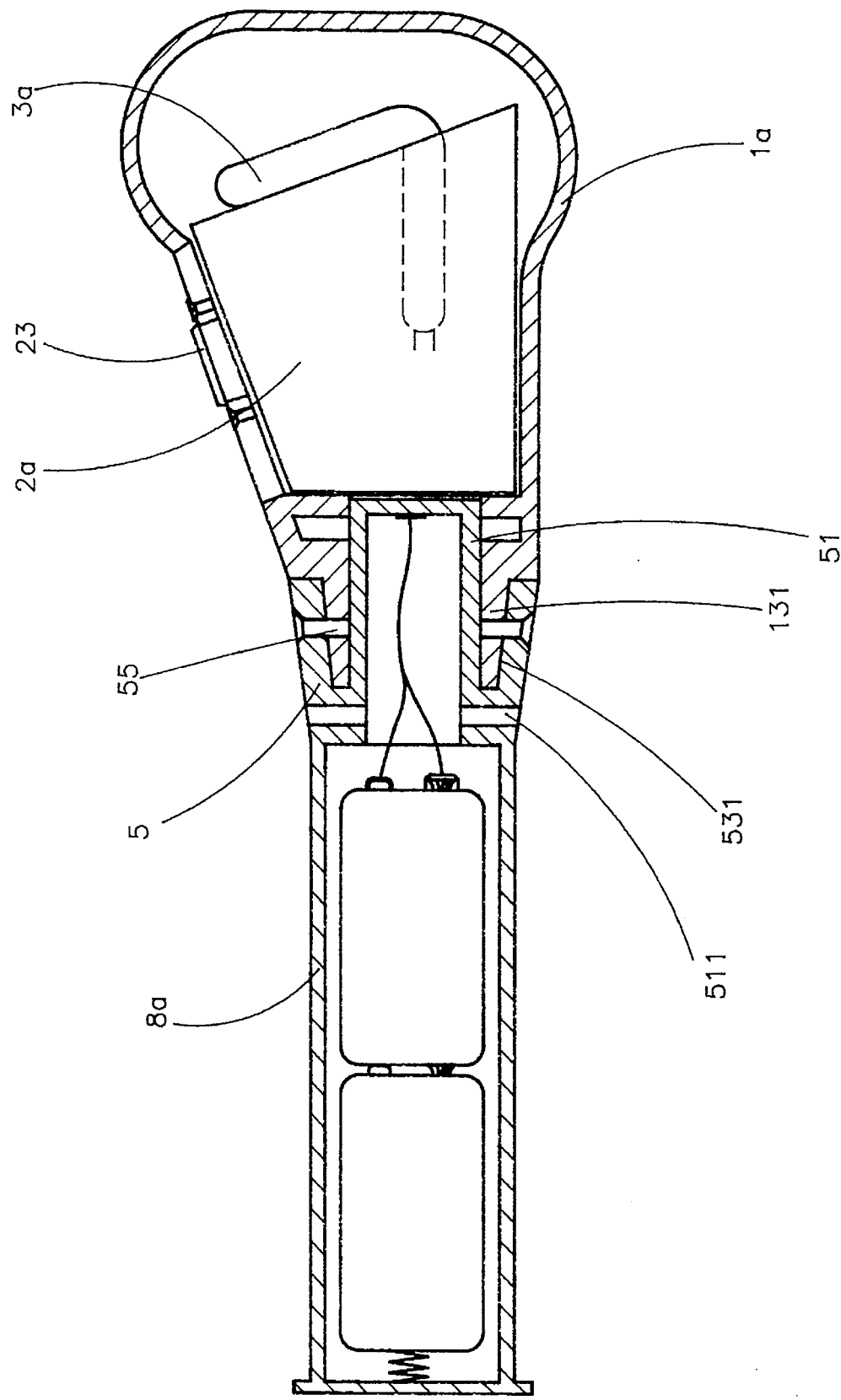
FIG. 5 shows the signal lamp assembly of the present invention incorporates with an elongated battery box to serve as a hand-held signal lamp.

Referring to FIG. 5, the mount 5 may be directly mounted on an elongated battery box 8a to hold the transparent shell 1a, permitting the battery power supply of the elongated battery box 8a to be electrically connected to the circuit board 4a of the electric box 2a. Therefore, the elongated battery box 8a, the transparent shell 1a, electric box 2a, neon tube 3a, circuit board 4a, and the mount 5 form a hand-held signal lamp.

While only one embodiment of the present invention has been shown and described, it will be understood that various modifications and changes could be made without departing from the spirit and scope of the invention.

What is claimed is:

1. A signal lamp assembly comprising:

a socket for covering on the top end of the gear lever of a motor vehicle, said socket having a plurality of bottom notches;

a mount for mounting on said socket, said mount comprising an upright center post, a longitudinal bottom hole defined within said upright center post for receiving said socket, an annular outer wall defining an annular chamber around said upright center post, a plurality of locating holes radially made through said annular outer wall and said longitudinal grooves, and a screw hole made through said annular outer wall at an elevation below said locating holes for the insertion of a tightening-up screw into one bottom notch on said socket to fix said mount to said gear lever;

a transparent shell mounted on said mount, said transparent shell comprising a bottom coupling neck inserted into the annular chamber on said mount, a longitudinal bottom hole, which receives the upright center post of said mount, a plurality of locating holes respectively connected to the locating holes on said mount by screws, and a plurality of locating posts raised from an inside wall thereof, each locating post defining a respective pin hole;

a circuit board mounted inside an electric box;

said electric box mounted inside said shell, said electric box having a plurality of locating pins respectively fitted into the locating holes on said locating posts of said shell, two insertion holes on a top side thereof, and a control panel disposed outside said shell, said control panel having a switch and an electric socket connecting said circuit board through said switch; and a neon tube disposed within said shell outside said electric box and having two opposite ends respectively inserted into the insertion holes on said electric box and electrically connected to said circuit board and controlled to operate by said switch.

2. The signal lamp assembly of claim 1 wherein said switch is an ON/OFF/FLASH control switch controlled to turn on/off said neon tube or to drive said neon tube to flash.

3. The signal lamp assembly of claim 1 wherein said electric socket is connected to said circuit board by an electric wire for connection to a battery power supply or a cigarette lighter socket of the motor vehicle, or an external battery power supply.

4. The signal lamp assembly of claim 3 further comprises an electric adapter for connecting said electric socket to an external power supply outlet.

5. The signal lamp assembly of claim 1 further comprises an elongated battery box for fastening to said mount for allowing the signal lamp assembly to be used as a hand-held signal lamp, said elongated battery box carrying a 9 V battery set to provide the necessary working power supply to said circuit board and said neon tube.

6. The signal lamp assembly of claim 5 wherein said 9 V battery set is connected to said circuit board through a three-step control switch, which is controlled to turn on/off said neon tube or to drive said neon tube to flash.

7. The signal lamp assembly of claim 1 wherein said mount comprises a plurality of longitudinal grooves spaced around said annular outer wall at an inner side, and said coupling neck of said transparent shell comprises a plurality of longitudinal ribs respectively fitted into said longitudinal grooves of said mount.

* * * * *